6 Sheets--Sheet 1.

MARY P. CARPENTER.

Sewing-Machine.

No. 131,739.

Patented Oct. 1, 1872.

Witnesses.

Inventor.
Mary P. Carpenter by
Dyer, Beadle & Co.
attys.

6 Sheets--Sheet 2.

MARY P. CARPENTER.
Sewing-Machine.

No. 131,739. Patented Oct. 1, 1872.

Witnesses.
R. H. Steele
T. J. Noyes.

Inventor.
Mary P. Carpenter by
Dyer, Beadle +Co.

6 Sheets--Sheet 3.

MARY P. CARPENTER.
Sewing-Machine.

No. 131,739. Patented Oct. 1, 1872.

Witnesses.
R. H. Steele
S. J. Noyes.

Inventor.
Mary P. Carpenter by
Dyer, Beadle & c.

AM. PHOTO-LITHOGRAPHIC CO. N.Y.(OSBORNE'S PROCESS.)

6 Sheets--Sheet 4.

MARY P. CARPENTER.
Sewing-Machine.

No. 131,739.　　　　　　　　　　Patented Oct. 1, 1872.

Witnesses.　　　　　　　　　　Inventor.

6 Sheets--Sheet 5.
MARY P. CARPENTER.
Sewing-Machine.
No. 131,739. Patented Oct. 1, 1872.
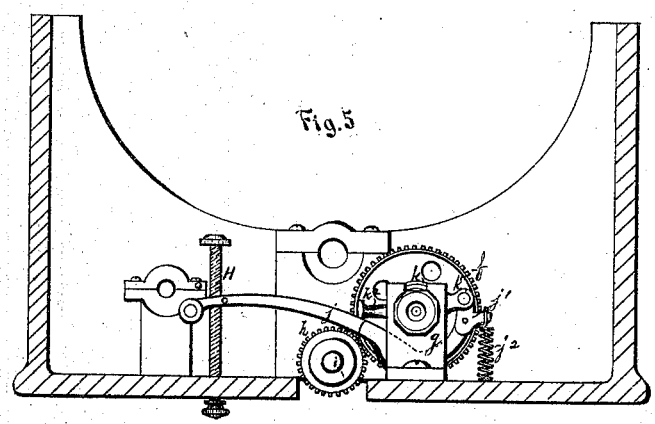
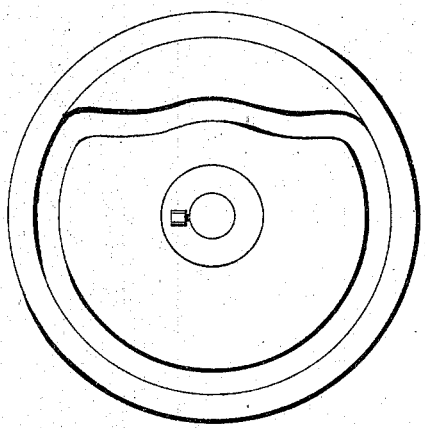
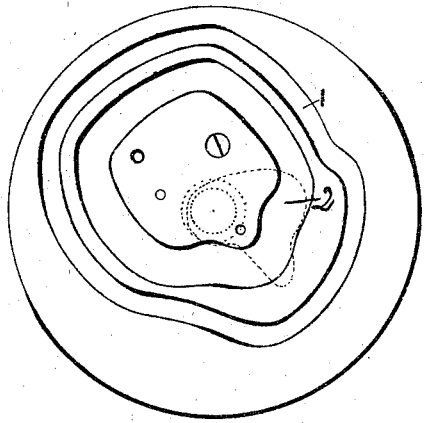
Witnesses.
R. H. Steele
P. J. Noyes
Inventor.
Mary P. Carpenter by
Dyer, Beadle & Co.
attys 6 Sheets--Sheet 6.

MARY P. CARPENTER.
Sewing-Machine.

No. 131,739.  Patented Oct. 1, 1872.

Witnesses.
R. H. Steele
S. J. Noyes.

Inventor.
Mary P. Carpenter by
Dyer, Beadle & Co.
Attys.

UNITED STATES PATENT OFFICE.

MARY P. CARPENTER, OF NEW YORK, N. Y.

IMPROVEMENT IN SEWING-MACHINES.

Specification forming part of Letters Patent No. 131,739, dated October 1, 1872.

*To all whom it may concern:*

Be it known that I, MARY P. CARPENTER, of New York, in the county of New York and State of New York, have invented a new and useful Improvement in Sewing-Machines; and I do hereby declare that the following is a full and exact description of the same, reference being had to the accompanying drawing, and to the letters of reference marked thereon.

This invention relates to that class of sewing-machines which are especially designed for sewing straw-braid; and consists mainly in the construction of the hooked needle employed for drawing the loop through the braid, and also in the mechanism for giving certain peculiar movements to said needle; it further consists, also, in details of construction relating to other parts, which, in connection with the foregoing, will be fully described hereinafter.

Figure 1:
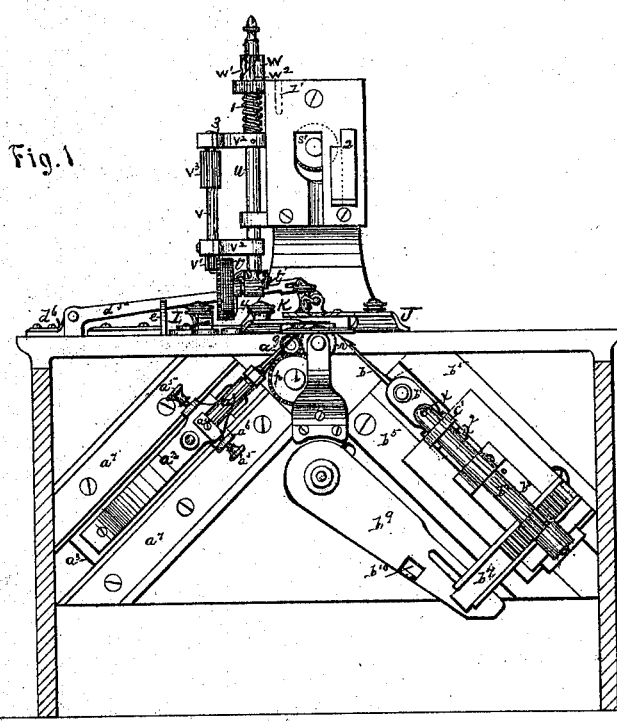
Figure 2:
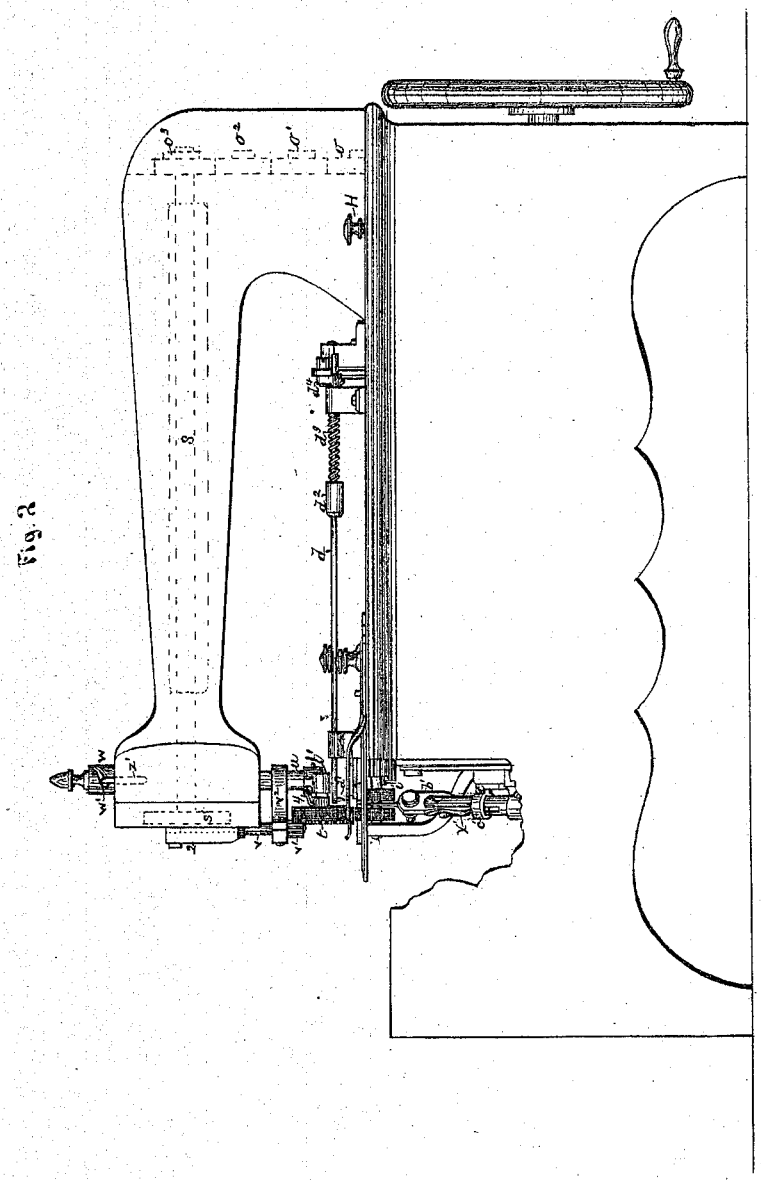
Figure 3:
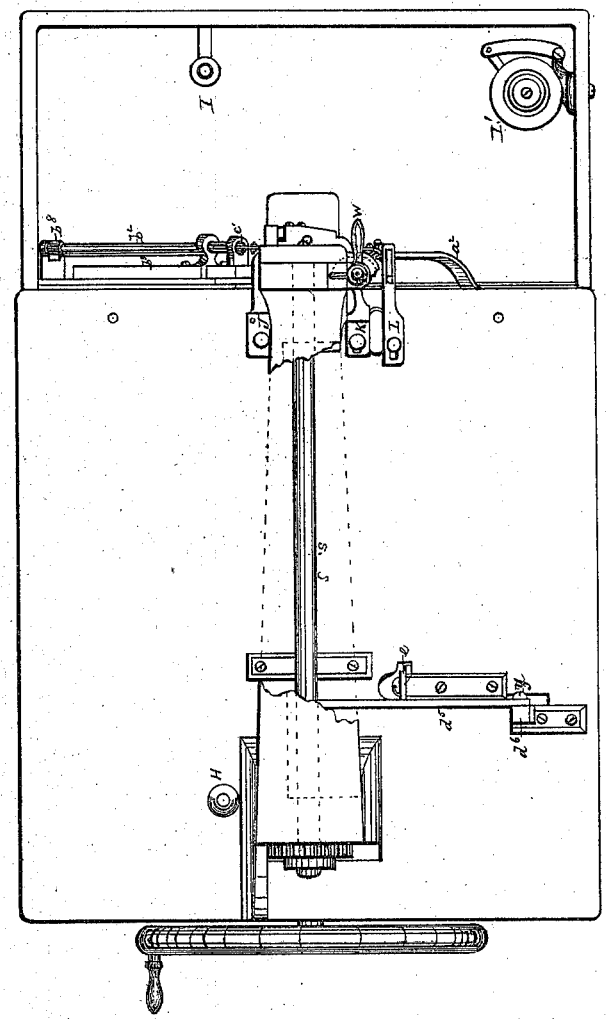
Figure 4:
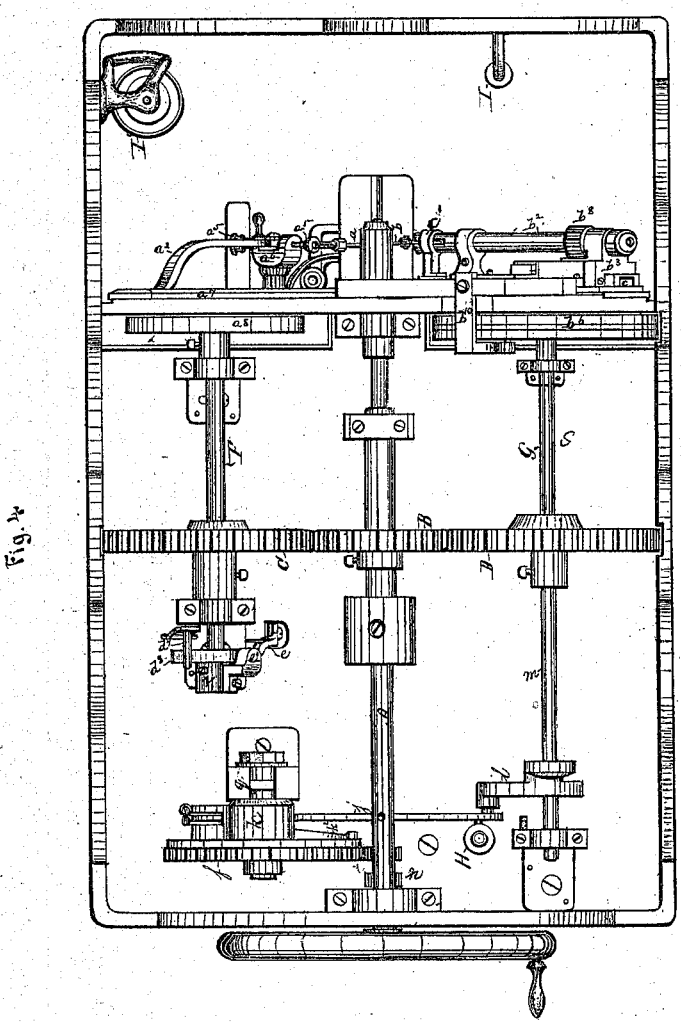
Figure 8:
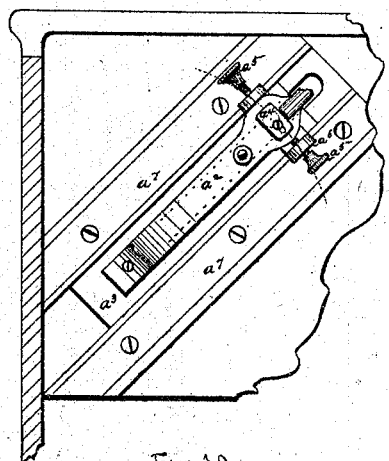
Figure 9:
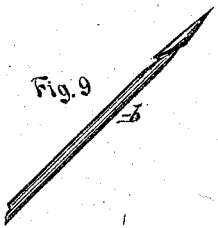
Figure 10:
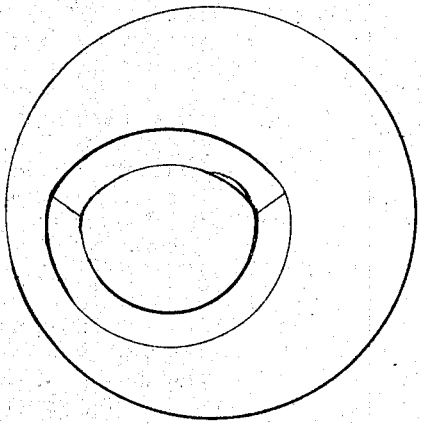
Figure 11:
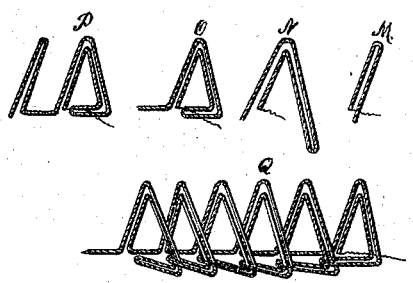

In the drawing, Figure 1 represents a front elevation of my improved machine, the end of the supporting-frame being cut away for the purpose of exposing the needles and the operating mechanism to full view; Fig. 2 represents a side elevation with a portion of the supporting-frame broken away to expose the hook-needle; Fig. 3 represents a plan view with a portion of the arm supporting the pressure-roller and upper feed, broken away to show the mechanism beneath; Fig. 4 represents a plan view of the machine reversed; Fig. 5 represents a front elevation in a reversed position of the mechanism for imparting the intermittent movement to the feed; Fig. 6 represents a plan view of the cam-groove which, through intermediate mechanism, gives the revolving motion to the hook-needle; Fig. 7 represents a plan view of the cam-grooves which give to the hook-needle, through intermediate mechanism, its reciprocating and tilting movement; Fig. 8 represents an enlarged view of the mechanism for regulating the length of the stitch; Fig. 9 represents an enlarged view of the hook-needle Fig. 10 represents a plan view of the cam-groove, which gives, through intermediate mechanism, the reciprocating movement to the eye-pointed needle; and Fig. 11 represents views of the stitch as in process of formation and as complete.

To enable others skilled in the art to make and use my invention, I will now proceed to describe fully its construction and manner of operation.

My improved machine may be generally described as follows: The mechanism for producing the stitch consists of an ordinary eye-pointed, thread-carrying needle and a hook-needle, both of which are located below the plate, and a hook located above the plate. The needles are both held in inclined positions, but lie in opposite directions, and they both receive a reciprocating movement from some suitable mechanism. The hook above the plate receives a reciprocating and also a lateral movement by means of suitable mechanism. The thread is carried by the eye-pointed needle up through the braid in an inclined direction, and is then caught by the hook above the plate and drawn out laterally away from the eye-pointed needle, so that a wide loop is formed, through which is passed the hook of the hook-needle as the latter rises in its upward movement. As soon as the latter passes through the loop thus formed, the hook releases it, (the loop,) and the needle moving backward through the braid carries the loop with it, but in an oppositely-inclined direction from that in which the loop entered the braid. The braid should now be moved ahead of the feed into position for the next stitch; but such movement would have a tendency to disengage the loop from the hook of the needle unless some provision was made to retain it; consequently the needle is given a double motion—first a tilting and then a revolving movement. In the tilting movement the needle is caused to swing slightly upon a pivot in such manner that its point is thrown out of the line of the thread, and thus the latter is held securely in grooves, which are cut upon an incline toward its rear side. In the revolving movement the needle is turned upon its longitudinal axis. By means of these movements the thread is inclined toward the rear side of the needle, and it is also twisted, so that it is rendered impossible for its hook to lose the thread during the operation of feeding. When the operation of feeding has been performed the hook-needle moves forward, but before completing its forward movement it is tilted and revolved back to its former position. The forward motion of the hook-needle disengages the loop from its hook, and the next loop, on the return movement of the needle being drawn through it, the stitch is completed. The feeding mechanism consists of upper and lower, roughened feed-wheels, which receive an intermittent revolving movement from mechanism which will be fully described hereinafter.

The particular mechanism employed for making the stitch will now be described in detail.

$a$, Fig. 1, represents the eye-pointed thread-carrying needle, which is secured in the needle-bar $a^1$, attached to the pivoted bar $a^2$, which latter is secured to the slide $a^3$. The free end of the bar $a^2$ is held by a plate and screw, $a^4$, the latter of which rests in a slot, as shown in dotted lines in Fig. 8. $a^5$ $a^5$ represent set-screws adapted to turn in bearings in the standard $a^6$, Fig. 4, which screws also serve to regulate the position of the bar $a^2$. The adjusting of the bar, by means of its slot and the screws described, changes the length of the stitch, by causing the needle to enter the braid at a point nearer or further away, as the case may be, from the point at which the hook-needle penetrates. The slide $a^3$ has a reciprocating movement in ways $a^7$, being actuated by means of a pin attached to its rear side, which rests in a cam-groove, Fig. 10, in the wheel $a^8$, Fig. 4. $b$ represents the hook-needle, attached to a needle-bar, $b^1$, pivoted at the point $x$ in the socket of rod $b^2$. The rod $b^2$ is attached to the slide $b^3$, which latter receives a reciprocating movement in the ways $b^5$ by means of a pin attached to its rear side, which rests in a cam-groove, 1, Fig. 7, in the wheel $b^6$, Fig. 4. This needle has three motions, the reciprocating movement, which is communicated to it by means of the slide $b^3$, a revolving, and also a tilting movement. The revolving movement is communicated to it by means of a rack, $b^7$, which engages with a pinion, $b^8$, Fig. 4, upon the rod $b^2$, the said rack being actuated by the pivoted arm $b^9$, Fig. 1, which itself receives movement from the bent arm $b^{10}$, Fig. 4, which has a reciprocating movement communicated to it by movement of its pin, which lies in a cam-groove, Fig. 6, in the wheel $b^6$. The tilting movement is caused by an independent slide, $c$, which moves within the main hollow slide $b^3$, and is actuated, also, by means of a pin attached to its rear side, which lies in an independent cam-groove, 2, Fig. 7, in the wheel $b^6$, Fig. 4. This slide is furnished with a ring, $c^1$, which, in its reciprocation, fits over the rear end of the peculiarly-formed bar $b^1$, to which the hooked needle is secured. When the slide $c$ moves forward independently of the slide $b^3$ it presses upon the projecting point $x^1$, Fig. 2, of the bar, and causes the needle to swing a little upon its pivot, and when it moves backward it presses upon the part $x^2$, Fig. 1, and produces the opposite effect. The needle itself, as shown enlarged in Fig. 9, has a hook cut upon one side with upwardly-inclined grooves running from the hook to the opposite side, the effect of which construction is to enable the needle to guide and hold the thread away from its point, so that it is rendered impossible for it to improperly lose the loop. The upper hook, adapted to take the thread from the eye-pointed needle and open the loop for the hook-needle, is shown in Figs. 1 and 2. It consists of a rod, $d$, terminating in a hook, $d^1$, which rod has two motions, a partial revolving motion upon its longitudinal axis, and a longitudinal movement. It is supported in proper bearings, and is provided with a shoulder, $d^2$, and spring $d^3$, as shown. The revolving movement of the hook is caused by partially turning the rod, which result is accomplished by the following mechanism: $d^4$ represents an arm rigidly attached to the rod $d$, but pivoted to one end of the elbow-lever $d^5$, Fig. 3, which latter is pivoted at $y$ to a standard, $d^6$. One end of the elbow-lever extends through the table, as shown in Fig. 4, and is provided at its extremity with a pin, $d^7$, which is moved by the revolution of a cam, $d^8$. The longitudinal movement of the rod which produces the lateral movement of the hook is caused by a pivoted arm, $e$, shown in Figs. 3 and 4, the upper end of which bears against the bar $d^5$. The lower end is brought in contact with a projecting arm, $e'$, attached to the sleeve of the cam $z$, by means of which it is caused to swing upon its pivot, and draw back the bar $d^5$, and consequently, also, the rod $d$. The spring $d^3$ being held at both ends causes the rod to have a quick return movement when the projection which actuates the bar $e$ has passed its end. The feeding mechanism is specially represented in Figs. 1, 2, 4, and 5. The mechanism for producing the intermittent movement of the feed will first be described. $f$, Fig. 5, represents a gear-wheel supported in suitable bearings upon a standard, $g$, as shown, which wheel engages with a pinion, $h$, upon a shaft, $i$, the front end of which is shown in Fig. 2, which shaft extends the length of the machine just below its top. The gear-wheel $f$ is actuated by means of an arm, $j$, loosely attached, by means of a link, $j^1$, to the arm $k^1$ of the sleeve $k$, which latter has also an arm, $k^2$, the end of which bears against the inner face of the gear-wheel $f$. The free end of the arm $j$ is provided with a friction-roller which bears against the cam $l$ upon shaft $m$, Fig. 4. The friction-roller is kept in contact with the cam by means of the spring $j^2$, as shown in Fig. 5. The revolution of the cam $l$ and the action of the spring $j^2$ causes the free end of the arm $j$ to have a reciprocating movement in a vertical plane, which produces an intermittent revolving movement of the wheel. The movement of the free end of the lever toward the top of the machine causes its opposite end to crowd the link $j^1$ and also the arm $k^2$ against the inner face of the wheel $f$. By this means the latter is held and caused to turn by the further movement of the arm. The return movement of the lever causes the link and the arm $k^2$ to relax their pressure upon the wheel, and consequently the latter is not then moved. Each movement of the wheel $f$ is communicated by means of the pinion $h$ to the shaft $i$, which latter communicates motion, by means of the wheel $n$, Fig. 4, to the wheels $o$ $o^1$ $o^2$ $o^3$, shown in dotted lines in Fig. 2, and also, by means of the pinion $p$, Fig. 1, to the wheel $q$, engaging with the lower feed-wheel $r$. The wheel $o^3$, Fig. 2, actuates the shaft $s$, shown in dotted lines Fig. 2, and also in plan in Fig. 3, which shaft is provided at its opposite extremity with the wheel $s'$ having teeth upon its face, as indicated in Fig. 1. The upper feed-wheel $t$, which serves also as the presser-foot, is hung in bearings in an arm, $t'$, attached to the foot of the standard $u$, which latter has a vertical movement in bearings attached to the main supporting-arm. The feed-wheel is actuated by means of the pinion $v^1$ upon the shaft $v$, hung in bearings in the arms $v^2$ $v^2$, which shaft is provided near its upper end with the additional elongated pinion $v^3$. This latter pinion, when the feed-wheel is in position for feeding the material, engages with the teeth upon the face of the wheel $s'$, from which it receives its motion. For the purpose of permitting the feed-wheel to act as a presser-foot, and in order that it may be turned out of the way when it is desired so to do, the shaft or standard $u$ is adapted to turn in its bearings. It is essential, however, before it is turned, that it should be raised from the surface of the work. For this purpose and for turning the shaft, I provide the handle $w$, Figs. 1, 2, and 3, which is provided with an inclined groove, $w^1$, as shown, and also the bent arm $w^2$ rigidly attached to the shaft, the free end of which arm rests, when the shaft $w$ is in its usual position, in the socket $z'$ in the supporting arm. By means of this construction, when the handle is operated, the shaft $u$ is raised by the pressure of the inclined side of the groove $w^1$ against the arm $w^2$, and caused to move in a direct vertical line, because the arm $w^2$ is guided by its socket. As soon, however, as the arm is free from its socket the shaft $u$ is free to swing out of the way.

The desired pressure of the feed-wheel is obtained from the spring 1. To secure the perfect contact of the pinion with the wheel $s^1$ a recess is formed in the plate 2, Fig. 1, into which a projection, 3, upon the end of the upper arm $v^2$, slides as the shaft $u$ descends. 4 represents a shield, which is attached to the arm $t^1$ and extends downward, adjacent to the inner face of the wheel.

The mechanism for receiving and communicating the power is shown in Fig. 4. A represents the main shaft, hung in proper bearings, and provided with a pulley or hand-wheel for receiving power. It is provided with a gear-wheel, B, which engages with the wheels C and D, the former of which gives motion to the shaft F, upon which is located the cam-wheel $a^3$, and also the sleeve $z$, which actuates the devices for operating the hook $d^1$. The latter gives motion to the shaft G, upon which is the cam-wheel $b^6$, and also the cam $e$ for operating the mechanism for giving the feed its intermittent movement. H represents an adjusting device by means of which the length of the movement made by the feed at each movement may be regulated. It consists of a screw-thread having a button at its lower end, which thread passes through a threaded orifice in the table, and is provided with a suitable cap, as shown. The button forms a stop, to limit, if desired, the movement of the arm $j$, and through it and its connections, the feed-wheels. If desired, the gear-wheel $f$ may be adjusted in its standard by making the latter slotted and providing the shaft of the former with a nut, as shown. I represents the spool-stand, and I' the tension device. J, K, and L represent suitable gages, &c., for holding the work. The stitch, in process of formation and as completed, is shown in Fig. 11. M represents the thread as carried up through the braid by the eye-pointed needle; N represents its position when the hook-needle has drawn the thread down through the braid; O represents its position when the braid has been moved by the feeding mechanism; P represents its position when the new loop has been carried up by the eye-pointed needle, and Q represents a series of completed stitches.

The operation is as follows: The eye-pointed needle having been properly threaded, the tension regulated, and the work suitably prepared and placed under the presser-foot, the machine is set in motion. The thread is first carried up by the eye-pointed needle through the braid in an inclined direction. Above the braid the thread is caught by the hook $d^1$, which draws it out away from the thread-carrying needle, and thus forms a wide loop, through which passes the point of the hook-needle. The loop, being now disengaged by the hook, is caught by the hook of the hook-needle, and is drawn down through the braid in an oppositely-inclined direction from that in which it was carried up through the braid. The hook-needle now tilts forward, so that its point is thrown out of the line of the thread, and it also revolves upon its longitudinal axis, after which the feed-wheels move forward the braid. The thread-carrying needle now moves forward, and also the hook-carrying needle, the latter, however, before completing its forward movement, being again tilted back and revolved into its former position. The eye-pointed needle again presents the thread, the hook again takes it and widens the loop, the hook of the hook-needle catches it and returns with it, this loop being drawn through the one previously made, by which means the stitch is completed.

The machine herein described is exceedingly effective in practical operation.

Having thus fully described my invention, what I claim, and desire to secure by Letters Patent, is—

1. The combination of the hook-needle and the mechanism for giving it a tilting movement, substantially as set forth.

2. The combination of the hook-needle and the mechanism adapted to give it a revolving movement, substantially as set forth.

3. The combination of the hooked needle and mechanism, substantially such as described, for giving it a tilting and revolving movement, as set forth.

4. The combination of the hook with the mechanism to give it a reciprocating and lateral movement, as set forth.

5. The combination of the cam-wheels $b^6$, the arm $b^{10}$, arm $b^9$, rack $b^7$, pinion $b^8$, and rod $b^2$, as set forth.

6. The combination of the bar $b^1$ having projections $x\ x'$ with the slide $c$ having the ring $c'$, as set forth.

7. The combination of the cam-wheel $b^6$, the intermediate mechanism, and the slides $b^3\ c$, as set forth.

8. The upper feed devices and presser-foot, consisting essentially of the spring-shaft $u$, arms $v^2\ v^2$, feed-wheel $t$, shaft $v$ with pinions $v^1\ v^3$ and handle $w$, and bar $w^2$, as set forth.

9. The combination of bar $d^5$, bar $e$, and projection $e'$, as set forth.

10. The combination of the bar $d$ having spring $d^3$ with bar $d^5$, and cam $d^8$, and bar $e$, and projection $e'$, as set forth.

This specification signed and witnessed this 23d day of February, 1872.

MARY P. CARPENTER.

Witnesses:
WILLIAM C. LUSK,
WILLIAM H. CLARKSON.